US012748542B2

(12) United States Patent
Malshe et al.

(10) Patent No.: US 12,748,542 B2
(45) Date of Patent: Sep. 29, 2026

(54) MEDIA MANAGEMENT

(71) Applicant: Micron Technology, Inc., Boise, ID (US)

(72) Inventors: Ashutosh Malshe, Fremont, CA (US); Antonio D. Bianco, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 18/584,814

(22) Filed: Feb. 22, 2024

(65) Prior Publication Data

US 2024/0192878 A1 Jun. 13, 2024

Related U.S. Application Data

(63) Continuation of application No. 17/576,033, filed on Jan. 14, 2022, now Pat. No. 11,914,878.

(51) Int. Cl.
*G06F 3/06* (2006.01)
*G06F 12/02* (2006.01)

(52) U.S. Cl.
CPC ............ *G06F 3/064* (2013.01); *G06F 3/0619* (2013.01); *G06F 3/0652* (2013.01); *G06F 3/0659* (2013.01); *G06F 3/0679* (2013.01); *G06F 12/0253* (2013.01); *G06F 2212/7211* (2013.01)

(58) Field of Classification Search
None
See application file for complete search history.

(56) References Cited

U.S. PATENT DOCUMENTS

| | | | | |
|---|---|---|---|---|
| 9,690,696 | B1 | 6/2017 | Hefner et al. | |
| 10,417,123 | B1 * | 9/2019 | Souri | G06F 12/0253 |
| 2004/0177212 | A1 * | 9/2004 | Chang | G11C 16/349 711/103 |
| 2014/0231954 | A1 | 8/2014 | Lue | |
| 2016/0103630 | A1 | 4/2016 | Shen | |
| 2016/0179386 | A1 | 6/2016 | Zhang | |
| 2021/0073063 | A1 | 3/2021 | Kale et al. | |
| 2021/0149753 | A1 | 5/2021 | Tanakamaru et al. | |
| 2021/0334030 | A1 | 10/2021 | Yang et al. | |

FOREIGN PATENT DOCUMENTS

WO 2017074570 A1 5/2017

OTHER PUBLICATIONS

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

* cited by examiner

*Primary Examiner* — Michael Alsip
(74) *Attorney, Agent, or Firm* — Brooks, Cameron & Huebsch, PLLC

(57) ABSTRACT

A method includes determining a health characteristic value of a block of memory cells, determining a difference between the health characteristic value and a health threshold, determining, based on the difference, a weight to associate with a block of memory cells, selecting, based on the weight, a block of memory cells for a media management operation; and performing a media management operation on the selected block of memory cells.

17 Claims, 6 Drawing Sheets

MEDIA MANAGEMENT

PRIORITY INFORMATION

This application is a Continuation of U.S. application Ser. No. 17/576,033, filed on Jan. 14, 2022, which will issue as U.S. Pat. No. 11,914,878 on Feb. 27, 2024, the contents of which are incorporated herein by reference.

TECHNICAL FIELD

Embodiments of the disclosure relate generally to memory sub-systems, and more specifically, relate to media management.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
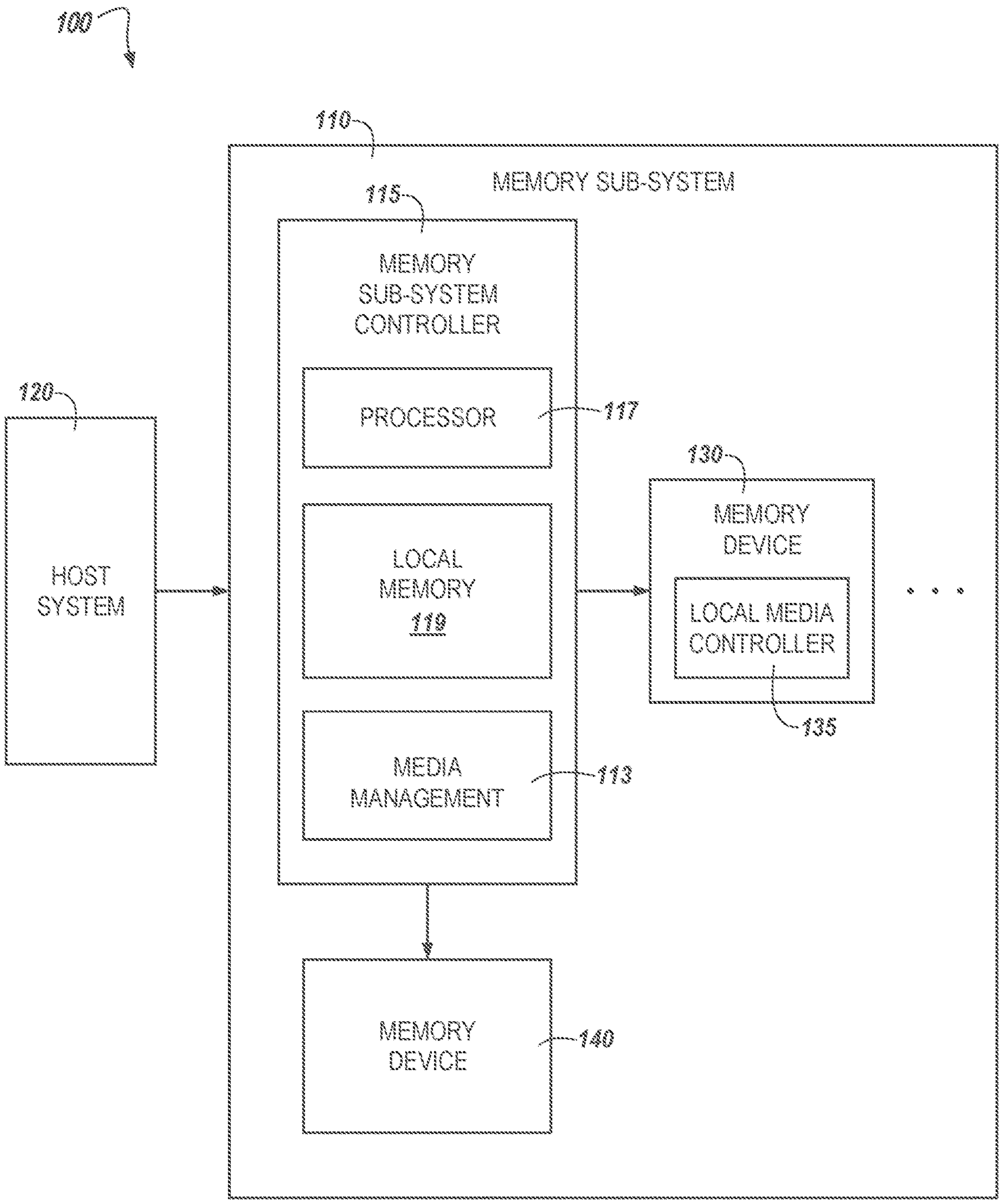
FIG. 1 illustrates an example computing system that includes a memory sub-system in accordance with some embodiments of the present disclosure.

Aspects of the present disclosure are directed to media management, in particular to memory sub-systems that include a media management component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Due to characteristics inherent in NAND memory devices, data quality can degrade over time. Health characteristics, as detailed herein, can indicate a degree of wear of a block of memory cells. For instance, a health characteristic can be a program-erase cycle (PEC) count of a block of memory cells, among other possible health characteristics. As used herein, a "PEC count" generally refers to the number of times a NAND block has been accessed (e.g., programmed and/or erased), which is a health characteristic value. As the PEC count of a block increases, data quality in the block can decrease. In some instances, the PEC count can be a PEC count of a physical block of memory cells. As used herein, a "physical block of memory cells" or "physical block" generally refers to a set of memory cells that store charges corresponding to data values and has an address (e.g., a physical block address) associated therewith.

Degradation of data quality can render blocks prone to failures such as causing a read operation performed on a memory cell in the block to fail or return a corrupted/incorrect data value. As such, some approaches perform media management operations on blocks. Non-limiting examples of media management operations can include error correction operations, wear leveling operations, read disturb mitigation operations, and/or garbage collection operations.

A "garbage collection operation" generally refers to a process of folding data from a victim block stripe into a new destination block stripe, with the intended purpose of data consolidation to free up memory resources for subsequent program/erase cycles. "Folding" data refers to the internal migration of data from one NAND location to another NAND location independent of any direct host interaction. Folding can be performed to pack valid data together (garbage collection), freeing more space for new writes, for error avoidance, for wear leveling, and to restore RAIN parity protection in the event of an error. As used herein, a "block stripe" generally refers to a logical grouping of blocks that share a same upper block number and can be accessed in parallel. Garbage collection operations can include reclaiming (e.g., erasing and making available for programming) memory blocks that have the most invalid pages among blocks in the memory device(s). In some embodiments, garbage collection can include reclaiming memory blocks with more than a threshold amount (e.g., quantity) of invalid pages. However, if sufficient free memory blocks exist for a programming operation, then a garbage collection operation may not occur.

A "wear leveling operation" generally refers to an operation performed on one or more blocks to control the wear rate of such blocks. Wear leveling operations can regulate the number of process cycles (e.g., program and/or erase cycles) performed on a particular group of blocks by spreading such cycles more evenly over an entire memory array and/or memory device. Examples of wear leveling operations include static wear leveling operations and dynamic wear leveling operations.

A "dynamic wear leveling operation" generally refers to the process of block stripe selection for erases and new writes by PEC count. However, dynamic wear leveling approaches do not typically attempt to account for or attempt to reduce a frequency of occurrence of static wear leveling operations, which as detailed herein, can degrade performance of a memory array during a static wear leveling operation.

A "static wear leveling operation" generally refers to a process of collecting and folding long resident drive data ("cold" data) into a block stripe that has higher wear than others in the system. Ideally the worn block stripe is entirely filled with "cold" data. In the event there is not enough "cold" data to entirely fill the block stripe, the remainder is typically filled with the "coldest" data available. That is, data (e.g., memory objects) can be assigned respective designations. As used herein, "memory object" refers to data that can be written to and/or read from a memory device.

Herein, data can have one of two or more designations. The first designation may be referred to as generally "hot" (e.g., hot memory object and/or "hot" data). The second designation may be referred to as generally "cold" (e.g., cold memory object and/or cold data). Other designations are possible. "Cold data," as used herein, means that particular data or a particular memory object has not been written to (i.e., write accessed) for a long duration relative to other data or memory objects. "Hot data," as used herein, means that particular data or a particular memory object has been written to (i.e., write accessed) frequently relative to other data or memory objects. By putting "cold" data into a "worn" block stripe using a static wear leveling operation, the difference between minimum and maximum block stripe PEC counts should be able to be kept within a reasonable range due to the high longevity of the data reducing the need for the block stripe to be folded and later erased. This separation of "cold" data into "worn" block stripes provides benefits in drive endurance, reduced write amplification, and performance benefits (such as reduced overhead in concurrently maintaining sets of NAND trim voltage levels). However, static wear leveling operations while generally effective, can degrade performance of a memory sub-system at least during occurrence of the static wear leveling operation. Moreover, static wear leveling operations do not intrinsically prioritize blocks with higher PEC counts as destination blocks.

Furthermore, existing wear leveling approaches are subject to variation in workloads (e.g., host workloads) that can delay or otherwise impact occurrence of the wear leveling, and thereby exacerbate any issues that the wear leveling operations are intended to address. Additionally, existing wear leveling approaches can inadvertently recirculate the same blocks in a free block pool which can cause the same high PEC count blocks to accumulate even higher PEC counts and/or increase in PEC counts at a disproportionate rate compared to other blocks. Such recirculation of blocks into the free block pool can ultimately reduce an efficiency of media management operations such as those that rely on PEC counts as a basis for determining when to conduct the media management operation, and thus a memory sub-system can experience degraded performance. Degradation of performance can be undesirable, especially in critical applications and/or in demanding applications in which very high memory sub-system performance is expected. Further, this degraded performance that can be exhibited in such approaches can be further exacerbated in mobile (e.g., smartphone, internet of things, etc.) memory deployments in which an amount of space available to house a memory sub-system is limited in comparison to traditional computing architectures.

Aspects of the present disclosure address the above and other deficiencies by utilizing enhanced thresholds/weights, etc. related to media management operations such as wear leaving operations, garbage collection operations, and/or other such wear leveling operations. That is, approaches herein account for the impact of variations in workload on real-world performance of media management operations and resultant drift in health characteristic values (e.g., PEC counts) across blocks under dynamically changing memory device and/or host workload conditions, and/or reduce a frequency of occurrence of static wear leveling operations, in contrast to other approaches that do not employ media management, as detailed herein.

For instance, embodiments herein contemplate that a difference between a health characteristic value (e.g., a PEC count) and a health threshold (e.g., an average PEC count) can be determined, a weight can be determined based on the difference, the weight can be associated with a block, a block can be selected based on the weight, and a media management operation (e.g., a dynamic wear leveling operation) can be performed on the selected block, as detailed herein. Further, in some embodiments a block having a health characteristic value that is less than a base health characteristic value can be added to a free block pool to promote writing data to the block, a block having a health characteristic value that exceeds an upper health characteristic threshold can be "frozen" so data is not written to the block or so that "cold" data is written to the block. Further still, some embodiments can, based on a coldness criterion and/or a health characteristic value, perform a media management operation (e.g., a static wear leveling operation) responsive to a determination that a difference between the highest and lowest health characteristic value of blocks of memory cells is greater than a base wear leveling threshold but less than an upper wear leveling threshold, as detailed herein.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, “coupled to” or “coupled with” generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point (“3D cross-point”) memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

As described above, the memory components can be memory dice or memory packages that form at least a portion of the memory device 130. In some embodiments, the blocks of memory cells can form one or more “superblocks.” As used herein, a “superblock” generally refers to a set of data blocks that span multiple memory dice and are written in an interleaved fashion. For instance, in some embodiments each of a number of interleaved NAND blocks can be deployed across multiple memory dice that have multiple planes and/or pages associated therewith. The terms “superblock,” “block,” “block of memory cells,”

and/or "interleaved NAND blocks," as well as variants thereof, can, given the context of the disclosure, be used interchangeably.

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system 110 can include a media management component 113. Although not shown in FIG. 1 so as to not obfuscate the drawings, the media management component 113 can include various circuitry to facilitate aspects of media management, as detailed herein. In some embodiments, the media management component 113 can include special purpose circuitry in the form of an ASIC, FPGA, state machine, and/or other logic circuitry that can allow the media management component 113 to orchestrate and/or perform the operations described herein.

In some embodiments, the memory sub-system controller 115 includes at least a portion of the media management component 113. For example, the memory sub-system controller 115 can include a processor 117 (processing device) configured to execute instructions stored in local memory 119 for performing the operations described herein. In some embodiments, the media management component 113 is part of the memory sub-system 110, an application, or an operating system.

In a non-limiting example, an apparatus (e.g., the computing system 100) can include a media management component 113. The media management component 113 can be resident on the memory sub-system 110. As used herein, the term "resident on" refers to something that is physically located on a particular component. For example, the media management component 113 being "resident on" the memory sub-system 110 refers to a condition in which the hardware circuitry that comprises the media management component 113 is physically located on the memory sub-system 110. The term "resident on" can be used interchangeably with other terms such as "deployed on" or "located on," herein.

The media management component 113 can be configured to determine a health characteristic value (e.g., a PEC count) of a block of memory cells. As used herein, "health characteristics" generally refer to quantifiable attributes of memory cells in a block that correspond to the quality, life expectancy, or other attributes of the memory cells that can affect the ability of the memory cells to accurately store data. Non-limiting examples of health characteristics or health metrics can include a raw bit error rate (RBER) associated with the memory cells, wear leveling characteristics associated with the memory cells, and/or a total quantity of program-erase cycles the memory cells have been subjected to, among others. As such, various scans such as a background scan, a RBER scan, a read scan, and/or an integrity scan can be employed to determine a given heath characteristic value. For instance, determination of the health characteristic value can include determination of at least one of a PEC count, an erase count, an age, or any combination thereof, of a block. In some embodiments, the health characteristic value such as a PEC count can be a value that is incremented in a table such as a look-up table or is otherwise stored or accessible to the memory sub-system 110.

The media management component 113 can be configured to compare the health characteristic value to a health threshold. For instance, a PEC count can be compared to a PEC threshold to permit determination of a difference between the PEC count and the PEC threshold. As used herein, a "PEC threshold" generally refers to a particular total number program-erase cycles. In some embodiments, the PEC threshold can be equal to 500, 1000, 1500, 2000, 3000, 4000, or 5000 program-erase cycles, among other possible types of health thresholds/values. In some embodiments, the health threshold can be a value that is stored in a table such as a look-up table or is otherwise stored or accessible to the memory sub-system. In any case, the media management component 113 can be configured to compare a health characteristic value to a health threshold and thereby determine a difference between the health characteristic value and the health threshold.

In some embodiments, the media management component 113 can be further configured to determine a weight based on a difference between the health characteristic value and the health threshold. For instance, the weight can be determined based on a magnitude and/or a direction of a difference between the health characteristic value and the health threshold, as detailed herein. A given weight can be associated with a block by altering a value in a table or otherwise associating the weight with a block. As detailed herein, some but not all blocks in the memory sub-system can be assigned a weight, in some instances.

The weight can influence a likelihood of a block to get selected for performance of a media management operation as compared to blocks in which a weight is not associated therewith. The weight (i.e., an erase count bias) can increase or decrease a likelihood that a block having a weight associated therewith is selected for a media management operation, as detailed herein. For instance, a weight can be associated with a block having a relatively large difference (e.g., large absolute value of a difference between a PEC count of the block and an average PEC count) such that the block is either more or less likely to be selected for performance of a media management operation, as detailed herein with respect to FIG. 2A, and thereby mitigate variations in health characteristic values across blocks such as variations in health characteristic values attributable to varied host workloads.

Conversely, when the difference (e.g., an absolute value of the difference) is equal to or less than a threshold difference then a block can remain without an associated weight. In such instances, in the absence of a weight associated to a block, then selection of blocks on which media management operations can be performed can occur normally (e.g., without any influence of the weights, as detailed herein).

The media management component 113 can be further configured to selectively perform a media management operation on a block. For instance, in some embodiments the media management component 113 can select a particular block of memory cells for a media management operation (e.g., a dynamic wear leveling operation and/or garbage collection operation, among other media management operations) based on a weight associated with a block and can perform a media management operation on the selected block, as detailed herein. However, in some embodiments, the media management component 113 can select a block of memory cells for a media management operation (e.g., a static wear leveling operation) responsive to a determination that a difference between a highest and lowest health characteristic values of the blocks of non-volatile memory cells is greater than a base wear leveling threshold but less than an upper wear leveling threshold, as detailed herein.

Figure 2A:
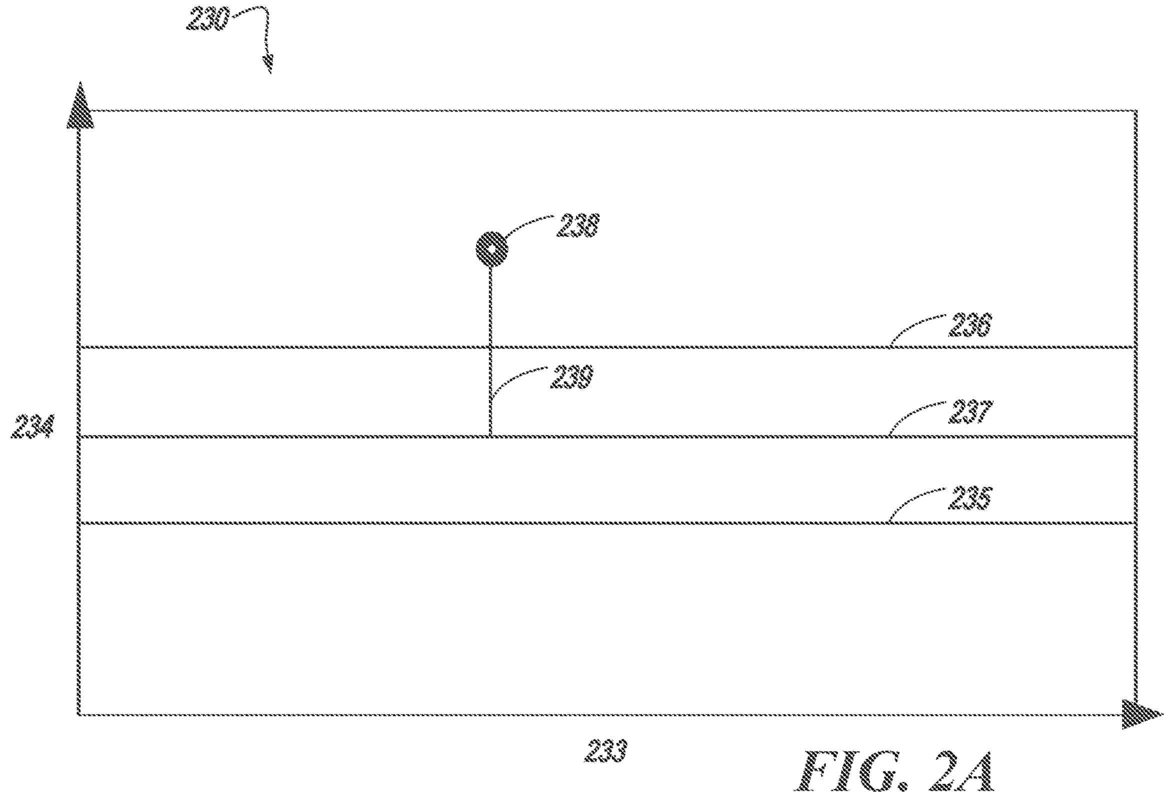
FIG. 2A illustrates an example diagram for media management in accordance with some embodiments of the present disclosure.
Figure 2B:
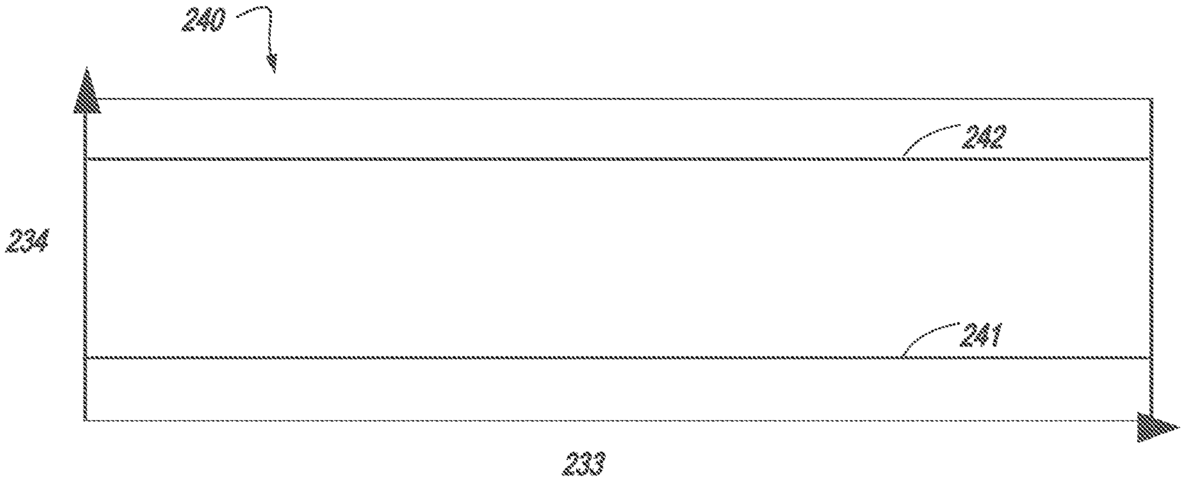
FIG. 2B illustrates another example diagram for media management in accordance with some embodiments of the present disclosure.

FIG. 2A illustrates an example diagram 230 for media management in accordance with some embodiments of the present disclosure. FIG. 2B illustrates another example diagram 240 for media management in accordance with some embodiments of the present disclosure. The diagrams 230 and 240 of FIG. 2A and FIG. 2B, respectively, illustrate aspects of performing media management for a memory sub-system having blocks of memory cells such as the memory sub-system 110. As mentioned, the memory sub-system 110 can include media, such as one or more volatile memory devices (e.g., memory device 140), one or more non-volatile memory devices (e.g., memory device 130), or a combination of such. As shown in FIG. 2A and FIG. 2B, the diagrams 230 and 240, respectively, can each have a first axis 233 representing a number of a block and a second axis 234 representing a health characteristic value. For instance, the health characteristic value can be a given PEC count of a block having a given number.

The diagram 230 can represent a health characteristic value 238 of a block of memory cells. The health characteristic value 238 can be compared to a health threshold 237 to determine a difference 239 between the health characteristic value 238 and the health threshold 237. As mentioned, it can be desirable to normalize or reduce any difference between a given health characteristic value and the health threshold (e.g., an average health characteristic value). That is, an amount of the difference between the given health characteristic value and the health threshold may be permitted to be an amount greater than or less than an average health characteristic value. However, when the amount of the difference (e.g., an absolute value of the difference) exceeds a threshold (upper health characteristic threshold 236 and/or the base health characteristic threshold 235) a weight can be associated with a block to influence block selection for a media management operation and thereby mitigate the amount of the difference.

For example, as illustrated in FIG. 2A, a weight may not be associated with a block having a health characteristic value that is greater than the base health characteristic threshold 235 (e.g., a base PEC count) but less than the upper health characteristic threshold 236 (e.g., a threshold PEC count). In such instances, in the absence of the weight, block selection for media management operations can be performed and/or can occur normally (e.g., without any influence of the weights).

However, as mentioned a weight can be associated with a block when the amount of the difference (e.g., an absolute value of the difference) exceeds a threshold. For instance, a weight can be associated with a block having a health characteristic value that is less than the base health characteristic threshold 235 or that is greater than the upper health characteristic threshold 236.

A given weight can be determined based on a magnitude and direction of the difference between the health characteristic value and the health threshold. The direction refers to whether the health characteristic value is above or below the health threshold 237. The magnitude refers to an absolute value of a difference (along the second axis 234) between the health characteristic value and the health threshold 237. For instance, for increasing distances along the second axis 234 between a given health characteristic value and the health threshold 237 a larger weight can be associated with a block.

For example, a larger weight can be associated with a block the further a given health characteristic value of the block is above the upper health characteristic threshold 236. Health characteristic values that are above the upper health characteristic threshold 236 cause a "positive" weight associated therewith to promote selection of different blocks with lower health characteristic values (e.g., below the base health characteristic threshold 235) for subsequent performance of media management operations. Stated differently, blocks with high health characteristic values (e.g., high PEC counts relative to an average PEC count) can be omitted from a free block pool and/or can remain unselected for performance of a media management operation to mitigate any further increase in the relatively high health characteristic values of such blocks.

Similarly, a larger weight can be associated with a block the further (along the second axis 234) a given health characteristic value of the block is below the base health characteristic threshold 235. Health characteristic values that are below the base health characteristic threshold 235 can have a "negative" weight associated therewith to promote selection of blocks with low health characteristic value (e.g., below the base health characteristic threshold 235) for subsequent performance of media management operations. For instance, in some embodiments the health characteristic value can be less than a base health characteristic value, and in such embodiments, performing the media management operation further comprises adding the block to a free block pool to promote selection of such blocks for media management operations. Addition of the block to the free block pool can occur in the absence of a host command (e.g., a host write operation and/or a host read operation to the memory sub-system). In this way, media management as detailed herein can occur without relying on a host command and/or in the absence any associated traffic over a bus or other connection between the host and the memory sub-system to promote normalizing health characteristic values regardless of any change in an amount of host activity.

While described above as associating a weight with a block when a health characteristic value is greater than a upper health characteristic threshold or less than a base health characteristic threshold the disclosure is not so limited. Rather, in some examples, a weight can be associated with a block having a health characteristic value that is less than a upper health characteristic threshold and greater than a base health characteristic threshold. In such instances, a weight may not be associated with a health characteristic value that is greater than the upper health characteristic value or less than a base health characteristic threshold. In any case, a weight can be associated with a block to alter the proclivity of the block to be selected for a media management operation.

In some examples, a runaway threshold can be included in performance of the media management operations described herein. The runaway threshold refers to a threshold having a value that is greater than the upper health characteristic threshold but that is less than a reliability threshold. The reliability threshold can be a threshold (e.g., a maximum number of PEC counts) at which memory sub-system performance is to decrease precipitously and/or decrease below a desired level of performance. In this manner, a block having a health characteristic value that is greater than the runaway threshold can be "frozen" such that the block is not placed into a free block pool and/or host commands which are intended to cause a memory operation (e.g., a read/write/erase operation) to occur can be ceased. For instance, the block having a health characteristic value that is "frozen" can be selected to undergo a media management operation such as a garbage collection operation to write any data from the block to a destination block having a lower health characteristic value and thereby promote retention of the data.

For instance, as illustrated in FIG. 2B, the diagram 240 illustrates a minimum health characteristic threshold 241 and runaway threshold 242. In such instances, blocks having respective health characteristic values that are less than the runaway threshold may not have a weight associated therewith (or can have a weight associated therewith as described in accordance with FIG. 2A). However, blocks having a health characteristic value that is greater than the runaway threshold 242 can have a weight associated therewith that ensures the block is "frozen" and/or undergoes a media management operation (e.g., undergoes the next permissible instance of a media management operation) to ensure that data written to and/or stored by the block remains valid and/or is written as part of a media management operation to a different block to ensure the data remains valid.

Figure 3:
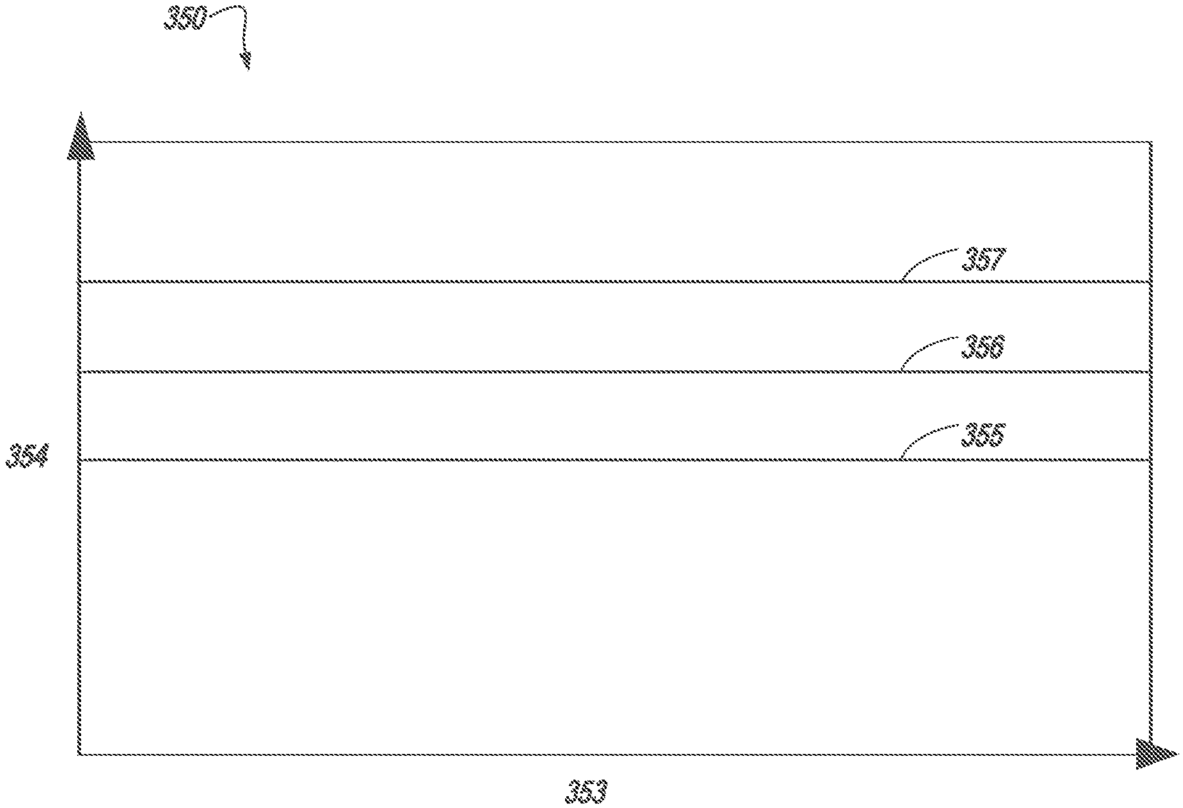
FIG. 3 illustrates another example diagram for media management in accordance with some embodiments of the present disclosure.

FIG. 3 illustrates another example diagram 350 for media management in accordance with some embodiments of the present disclosure. As illustrated in FIG. 3, the diagram 350 can include a first axis 353 representing a block stripe number of a plurality of blocks. The diagram 350 includes a second axis 354 representing values of differences between health characteristic values of the blocks of non-volatile memory cells. For example, highest and lowest health characteristics can be determined. For instance, a highest health characteristic value can be determined for a block having data written thereon and a lowest health characteristic value can be determined for a free block in a free block pool, among other possibilities.

The diagram 350 can include a plurality of thresholds that, depending on other factors (e.g., data coldness and/or a health characteristic value), can trigger a static wear leveling operation, in contrast to other static wear leveling approaches that may employ an individual threshold to trigger a static wear leveling operation. The thresholds can include an upper wear leveling threshold 357, an intermediate wear leveling threshold 356, and a base wear leveling threshold 355.

In some embodiments, when a differences between the highest and lowest health characteristic value is above the upper wear leveling threshold 357 a static wear leveling operation can be performed. In such instances, the static wear leveling operation is performed regardless of data coldness and/or a given health characteristic value. That is, the difference between the highest and lowest health characteristic value is sufficiently large to justify any increase in computation overhead/network traffic, etc. associated with performing a static wear leveling operation.

For instance, a static wear leveling operation can be performed on a block having a highest health characteristic value, and thereby mitigate the difference between the highest and lowest health characteristic values of the blocks. For example, a static wear leveling operation can write data from a source block to a destination block. The destination block can be selected from a free block pool. A block having a given health characteristic value (e.g., a block having the highest health characteristic value) can be selected as the source block. The destination block (e.g., a selected destination block) can have a lower health characteristic value than the source block. In some examples, a block having a given health characteristic value (e.g., a lowest health characteristic value) in the free block pool can be selected as the destination block, among other possibilities.

In some instances, a difference between a highest health characteristic value and a lowest health characteristic value can be less than an individual (e.g., the only) static wear leveling threshold. In such instances, traditional static wear leveling approaches may not perform a static wear leveling operation (due to the difference being less than the individual static wear leveling threshold) regardless of data coldness and/or a given health characteristic value.

However, approaches herein can perform a static wear leveling operation based on data coldness and/or a given health characteristic value. For instance, a value of a difference between the highest and lowest health characteristic values can be greater than the base wear leveling threshold 355 but less than the intermediate wear leveling threshold 356. In such instances, selection of a block for a wear leveling operation such as a static wear leveling operation can be based on a data coldness, a health characteristic value, or both. For instance, in some embodiments when the coldness of the data in a block in the memory-sub-system satisfies (e.g., exceeds) a coldness criterion the block can be selected for a wear leveling operation such as a static wear leveling operation. Similarly, in some embodiments, when a heath characteristic value of a block is above a health threshold (e.g., a given PEC count) a block can be selected for a static wear leveling operation.

For example, when the difference between the highest and lowest health characteristic values is less than the intermediate wear leveling threshold 356 but greater than the base wear leveling threshold 355 a static wear leveling operation can be performed when a coldness criterion is satisfied (e.g., an amount of "cold" data in a block exceeds the coldness criterion) and a health characteristic value of the block is greater than a health threshold. In this way, a static wear leveling operation can be performed when conditions are amenable to efficiently perform a static wear leveling operation (e.g., cold data is present and block with a high health characteristic value is present) and thus normalize health characteristic values between blocks to promote aspects herein, whereas in other approaches a static wear leveling operation would not be performed unless the difference between the highest and lowest health characteristic values exceed an individual threshold that is the same/similar to the upper wear leveling threshold 357. Similarly, when the difference between the highest and lowest health characteristic values is greater than the intermediate wear leveling threshold 356 but less than the upper wear leveling threshold 357 a static wear leveling operation can be performed when a coldness criterion is satisfied (e.g., an amount of "cold" data in a block exceeds the coldness criterion), whether or not a health characteristic value is above a health threshold.

In some examples, when the difference between the highest and lowest health characteristic values is less than the base wear leveling threshold 355 a static wear leveling operation may not be performed. In such instances, a static wear leveling operation is not performed regardless of data coldness and/or a given health characteristic value. That is, below the base wear leveling threshold 355, performance of a static wear leveling operation may not provide a sufficient long term performance enhancement to justify any increase in computation overhead/network traffic, etc., associated with performing a static wear leveling operation.

Figure 4A:
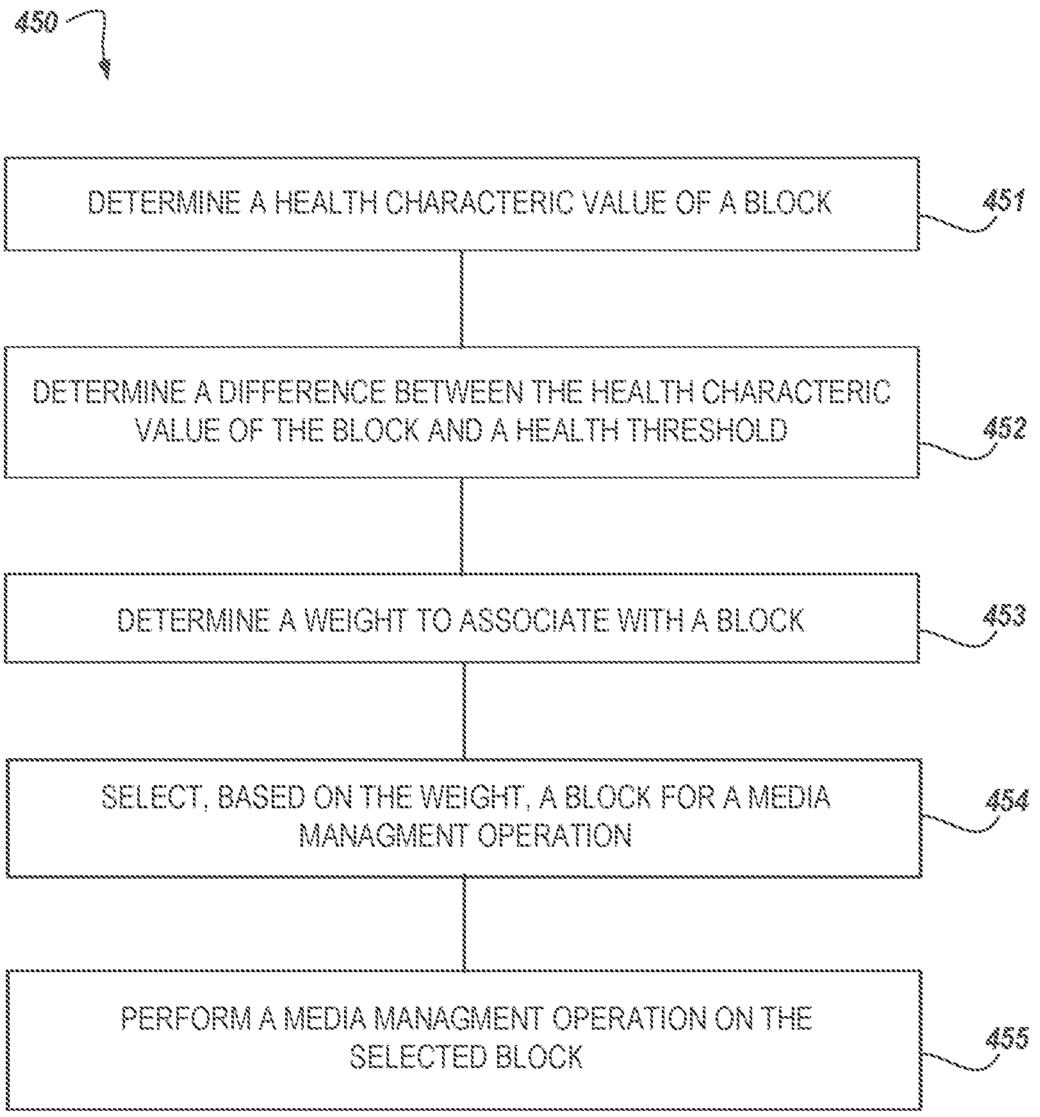
FIG. 4A is a flow diagram corresponding to a method for media management in accordance with some embodiments of the present disclosure.
Figure 4B:
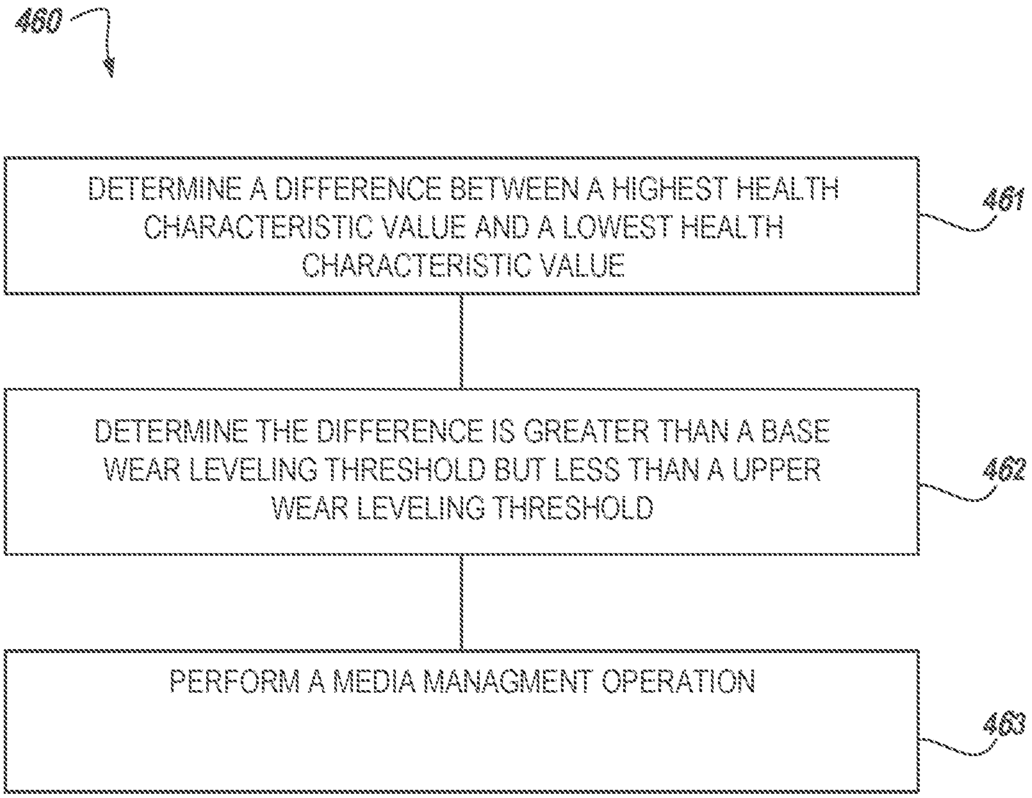
FIG. 4B is another flow diagram corresponding to another method for media management in accordance with some embodiments of the present disclosure.

FIG. 4A is flow diagram corresponding to a method 450 for media management in accordance with some embodiments of the present disclosure. In some embodiments, the method 450 can be employed as a part of or in conjunction with a dynamic wear leveling operation. FIG. 4B is another flow diagram corresponding to another method 460 for media management in accordance with some embodiments of the present disclosure. In some embodiments, the method 460 can be employed as a part of or in conjunction with a static wear leveling operation.

The method 450 and/or the method 460 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 and/or the method 460 is performed by the media management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 451, a health characteristic value can be determined. For instance, a PEC count or other indicator of block wear can be determined. The health characteristic value can be determined for a physical block of memory cells in a memory sub-system including a plurality of physical blocks of memory cells. In some embodiments, the memory sub-system can be analogous to the memory sub-system 110 illustrated in FIG. 1. As described above, the memory components can be memory dice or memory packages that are coupled to one another to create an array of memory cells, such as a three-dimensional stackable cross-gridded array of memory cells used by the memory sub-system to store data.

At operation 452, a difference between the health characteristic value, as determined at 451, and a health threshold can be determined. The health threshold can be an average of health characteristic values of a sub-set of or all of the blocks of memory cells in a memory sub-subsystem. The difference can be determined responsive to determining the health characteristic value, among other possibilities.

As mentioned, it can be desirable to mitigate the difference between the health characteristic value and the health threshold. As such, at operation 453, a weight to associate with a block can be determined. As mentioned, the weight associated with a block can influence performance of media management operations and thereby mitigate the difference between the health characteristic value and the health threshold. That is, the weight (i.e., an erase count bias) can increase or decrease a likelihood that a block having a weight associated therewith can be selected for a media management operation. In various examples, the weight can decrease the likelihood of the block having the weight associated therewith to be selected for the media management operation, and thereby promote the selection of different blocks (e.g., those without a weight) for a media management operation.

For instance, when a difference (e.g., an absolute value of the difference) is equal to or less than a difference between a health threshold and the base health characteristic threshold (e.g., 235 as illustrated in FIG. 2A) or the upper health characteristic threshold (e.g., 236 as illustrated in FIG. 2A) then the difference may be deemed acceptable, and no weight is associated with a block. Stated differently, when a determined health characteristic value is less than the upper health threshold but greater than the base health characteristic value then no weight is associated with a block. In such instances, in the absence of association of the weight with the block selection of blocks for media management operations occurs normally (e.g., without influence of the weights, as detailed herein).

Conversely, when a difference (e.g., an absolute value of the difference) is greater than a difference between a health threshold and the base health characteristic value or the upper health characteristic value then the difference may be deemed unacceptable, and a weight can be associated with a block. Stated differently, when a determined health characteristic value is greater than the upper health threshold or less than the base health characteristic value then a weight is associated with a block.

A value and/or a sign (negative/positive) of the weight can vary based on a magnitude and/or direction of the difference from the health threshold. For example, the weight can be determined based on a magnitude of a difference between a health characteristic value (e.g., a PEC count) and a health threshold (e.g., an average PEC count).

At operation 454, a block can be selected for a media management operation. For instance, a block can be selected having a highest weight and/or a block can be selected having a given characteristic (e.g., a given health characteristic value) in combination with having a relatively high weight. While described above as selecting blocks with high or highest weights, in some embodiments blocks with low or lowest weight can be selected. In any case, block selection can occur under the influence of weights to promote aspects herein (e.g., to account for the impact of variations in workload on actual real-world performance of media management operations and resultant drift in health characteristic values (e.g., PEC counts) across blocks under dynamically changing host workload conditions, and/or to reduce a frequency of occurrence of static wear leveling operations).

Some embodiments can select, from a free block pool, a destination block for a media management operation. The selected destination block can be a block in the free block pool having a high health characteristic value (e.g., a high PEC count). For example, a destination block having a high PEC count (e.g., the highest PEC count) can be selected and "cold" data can be written to the destination block such that the high PEC count block is permitted to "rest" and thereby promote normalizing PEC counts (e.g., reduction of a difference between a highest PEC count and lowest PEC count) of a plurality of blocks.

At operation 455, the method 450 can include selective performance of a media management operation, as detailed herein. For instance, the method 450 can include selectively performing a media management operation on a block that is selected at 454.

As mentioned, FIG. 4B is another flow diagram corresponding to another method 460 for media management in accordance with some embodiments of the present disclosure. In some embodiments, the method 460 can be employed as a part of or in conjunction with a static wear leveling operation.

As mentioned, respective health characteristic values can be determined for blocks of non-volatile memory cells, as detailed herein. At operation 461, a difference between a highest health characteristic value and a lowest health characteristic value of blocks of non-volatile memory cells can be determined, as detailed herein. At operation 462, the difference, as determined at 461, can be determined to be greater than a base wear leveling threshold but less than an upper wear leveling threshold, as detailed herein.

At operation 463, the method 460 can include selective performance of a media management operation, as detailed herein. For instance, a block can be selected, as detailed herein, and the media management operation can be performed to write data from a source block to a destination block. The source block and the destination block can be selected as detailed herein. For instance, a static wear leveling operation can be performed based on a coldness criterion, a health characteristic value, or both, as detailed herein.

Figure 5:
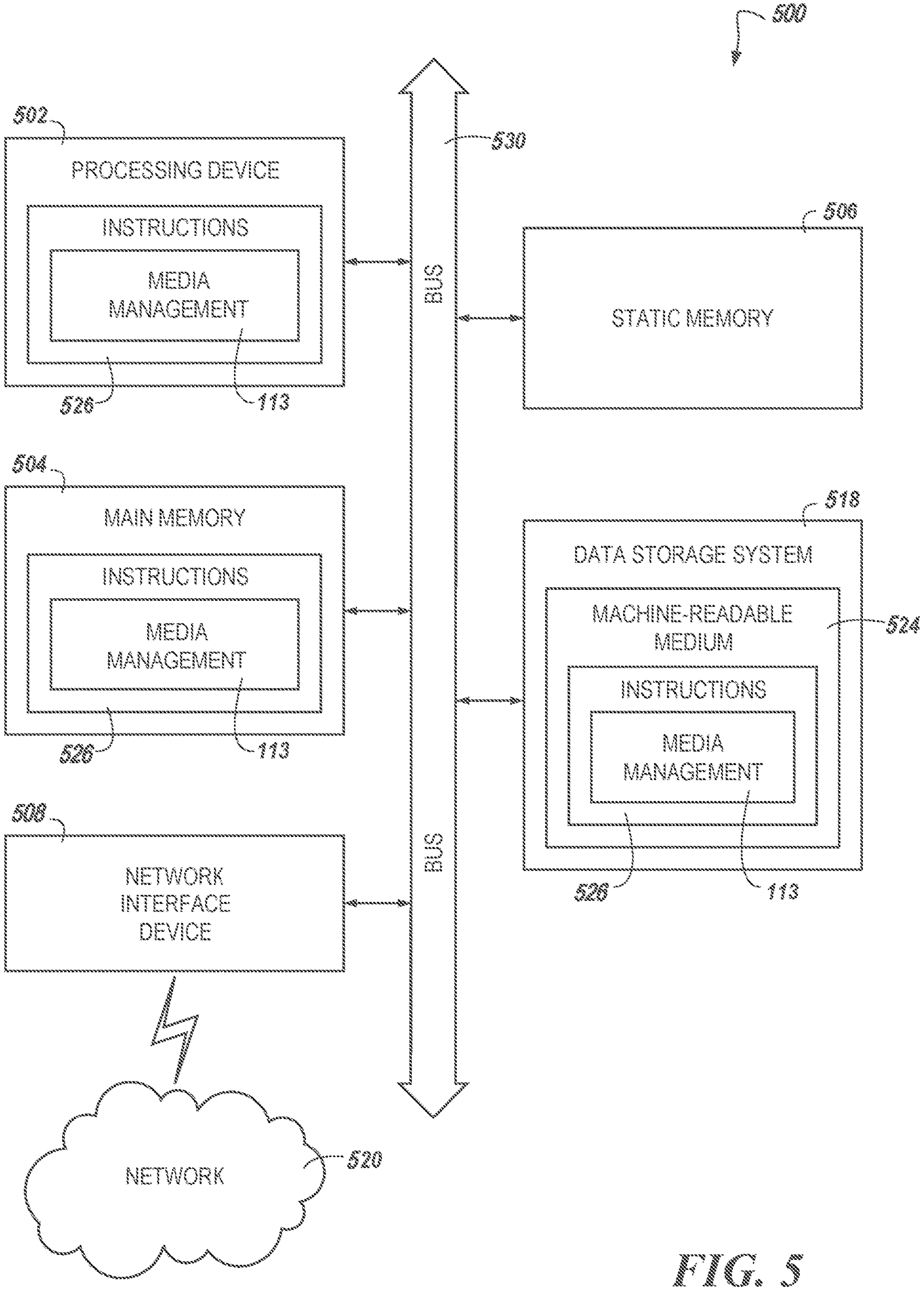
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a media management component (e.g., the media management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

determining a program erase cycle (PEC) count of each block in a plurality of blocks of memory cells;

determining, based on a difference between a PEC count of a particular block and a PEC count threshold, whether to associate a weight with the particular block;

wherein the PEC count threshold is calculated by determining an average PEC count of the PEC counts of the plurality of blocks of memory cells; and associating a first weight with the particular block responsive to the PEC count of the particular block being determined to be a first threshold quantity above the PEC count threshold;

associating a second weight with the particular block responsive to the PEC count of the particular block being determined to be a second threshold quantity below the PEC count threshold;

associating no weight with the particular block responsive to the PEC count of the particular block being determined to be between the first threshold quantity and second threshold quantity;

in association with performing a media management operation, determining whether to select the particular block of memory cells, wherein the particular block is more likely to be selected relative to another block, if it has the first weight associated therewith as compared to if the particular block has no weight associated therewith and is less likely to be selected relative to another block if it has the second weight associated therewith as compared to if the particular block has no weight associated therewith.

2. The method of claim 1, further comprising:
performing a wear leveling operation in response to a PEC count that is above an upper wear leveling threshold value.

3. The method of claim 2, wherein the wear leveling operation is performed on a block having a highest PEC count.

4. The method of claim 2, wherein the wear leveling operation includes selecting a block having a highest PEC count as a source block for the media management operation.

5. The method of claim 2, wherein the wear leveling operation includes selecting a block having a lowest PEC count as a destination block for the media management operation.

6. The method of claim 5, wherein the destination block for the wear leveling operation is selected from a free block pool.

7. An apparatus, comprising:
blocks of memory cells; and
a media management component coupled to the blocks of memory cells, wherein the management component is configured to:
determine a PEC count of each block in the blocks of memory cells;
determine, based on a difference between a PEC count of a particular block and a PEC count threshold, whether to associate a value of a weight with the particular block of memory cells;
wherein the PEC count threshold is calculated by determining an average PEC count of the PEC counts of multiple blocks of memory cells; and
associating a first weight with the particular block responsive to the PEC count of the particular block being determined to be a first threshold quantity above the PEC count threshold;
associating a second weight with the particular block responsive to the PEC count of the particular block being determined to be a second threshold quantity below the PEC count threshold:
associating no weight with the particular block responsive to the PEC count of the particular block being determined to be between the first threshold quantity and the second threshold quantity;
in association with performing a media management operation, determine whether to select the particular block, wherein the particular block is more likely to be selected relative to another block if it has the first weight associated therewith as compared to if the particular block has no weight associated therewith and is less likely to be selected relative to another block if it has the second weight associated therewith as compared to if the particular block has no weight associated therewith.

8. The apparatus of claim 7, wherein the media management operation further comprises a static wear leveling operation.

9. The apparatus of claim 8, wherein the static wear leveling operation is performed in response to a PEC count that is above a wear leveling threshold value.

10. The apparatus of claim 8, wherein the static wear leveling operation is performed on a block having a highest PEC count.

11. The apparatus of claim 10, wherein the static wear leveling operation includes selecting a block having a highest PEC count as a source block for the media management operation.

12. The apparatus of claim 10, wherein the static wear leveling operation includes selecting a block having a lowest PEC count value as a destination block for the media management operation.

13. A system comprising:
a memory sub-system comprising a plurality of memory components arranged to form a stackable cross-gridded array of a plurality of blocks of memory cells; and
a processing device coupled to the plurality of memory components, the processing device to perform operations comprising:
determining a health characteristic value corresponding to a program-erase cycle (PEC) count associated with each block in the plurality of blocks of memory cells;
determining, based on a difference between a PEC count of a particular block and a PEC count threshold, whether to associate a weight with the particular block;
wherein the PEC count threshold is calculated based on an average PEC count of the PEC counts of the plurality of blocks of memory cells;
associating a first weight with the particular block responsive to the PEC count of the particular block being determined to be a first threshold quantity above the PEC count threshold;
associating a second weight with the particular block responsive to the PEC count of the particular block being determined to be a second threshold quantity below the PEC count threshold;
associating no weight with the particular block responsive to the PEC count of the particular block being determined to be between the first threshold quantity and second threshold quantity; and
in association with performing a media management operation, determining whether to select the particular block, wherein the particular block is more likely to be selected relative to another block if it has the first weight associated therewith as compared to if the particular block has no weight associated therewith and is less likely to be selected relative to another block if it has the second weight associated therewith as compared to if the particular block has no weight associated therewith.

14. The system of claim 13, wherein the media management operation is a wear leveling operation.

15. The system of claim 14, wherein the wear leveling operation is a static wear leveling operation.

16. The system of claim 14, wherein the wear leveling operation includes selecting a block associated with a highest value of PEC count as a source block for the media management operation.

17. The system of claim 15, wherein the wear leveling operation includes selecting a block associated with a lowest value of PEC count as a destination block for the media management operation.

* * * * *